(12) United States Patent
Um

(10) Patent No.: US 11,094,178 B2
(45) Date of Patent: Aug. 17, 2021

(54) TRIAXIAL DOME-TYPE SURVEILLANCE CAMERA

(71) Applicants: CTS SYSTEM CO., LTD., Bucheon-si (KR); Tae Jun Um, Seoul (KR)

(72) Inventor: Tae Jun Um, Seoul (KR)

(73) Assignees: CTS SYSTEM CO., LTD., Bucheon-si (KR); Tae Jun Um, Seoul (KR)

( * ) Notice: Subject to any disclaimer, the term of this patent is extended or adjusted under 35 U.S.C. 154(b) by 0 days.

(21) Appl. No.: 17/054,132

(22) PCT Filed: May 7, 2019

(86) PCT No.: PCT/KR2019/005397
§ 371 (c)(1),
(2) Date: Nov. 9, 2020

(87) PCT Pub. No.: WO2019/216611
PCT Pub. Date: Nov. 14, 2019

(65) Prior Publication Data
US 2021/0125472 A1    Apr. 29, 2021

(30) Foreign Application Priority Data

May 9, 2018  (KR) ........................ 10-2018-0053128

(51) Int. Cl.
*G08B 13/196*  (2006.01)
*H04N 5/225*  (2006.01)

(52) U.S. Cl.
CPC ... *G08B 13/19619* (2013.01); *G08B 13/1963* (2013.01); *G08B 13/19632* (2013.01); *H04N 5/2252* (2013.01)

(58) Field of Classification Search
CPC ........ G08B 13/19619; G08B 13/19632; G08B 13/1963; H04N 5/2252
USPC ................................ 348/373–376, 143, 151
See application file for complete search history.

(56) References Cited

U.S. PATENT DOCUMENTS

| 7,170,560 | B2 * | 1/2007 | Tatewaki | ......... G08B 13/19619 |
| | | | | 348/151 |
| 2005/0174476 | A1 * | 8/2005 | Tamura | .............. G08B 13/1963 |
| | | | | 348/373 |
| 2005/0243170 | A1 | 11/2005 | Chang | |

FOREIGN PATENT DOCUMENTS

| JP | 4092796 B2 | 5/2008 |
| KR | 10-1001601 B1 | 12/2010 |
| KR | 10-2011-0070149 A | 6/2011 |
| KR | 10-2012-0029321 A | 3/2012 |
| KR | 20-0467572 | 6/2013 |

* cited by examiner

*Primary Examiner* — Yogesh K Aggarwal
(74) *Attorney, Agent, or Firm* — Maschoff Brennan

(57) ABSTRACT

The present invention relates to a triaxial dome-type surveillance camera comprising: an upper cap (10) having a camera module (M) embedded therein; and a lower cap (20) coupled to a lower part of the upper cap (10), wherein the upper cap (10) and the lower cap (20) are seated on a triaxial rotary body (40) of the surveillance camera to be triaxially rotated, and a diffused reflection preventing device (13) is positioned on the upper cap (10), to which the camera module (M) is coupled, so as to prevent the diffused reflection of light, the diffused reflection degrading the quality of a photographed image.

6 Claims, 5 Drawing Sheets

(a)

(b)

(a)

(b)

TRIAXIAL DOME-TYPE SURVEILLANCE CAMERA

TECHNICAL FIELD

The present invention relates to a triaxial dome-type surveillance camera, and more particularly, to a triaxial dome-type surveillance camera including a triaxial rotary body capable of performing a triaxial rotation to freely change a capturing angle of a camera, and including a diffused reflection preventing device provided on an upper cap to which a camera module is coupled so as to prevent diffused reflection of light that degrades quality of a captured image.

BACKGROUND ART

In general, surveillance cameras are installed on roads, large buildings, department stores, factories, exhibition halls, and the like to recognize traffic conditions, theft of goods, operation states of machines, and the like from a long distance. In recent years, as networks develop, the surveillance cameras have been installed in each home to additionally perform a function of monitoring external intrusion.

In other words, various types of surveillance cameras such as a dome-type surveillance camera, a zoom surveillance camera, and an infrared surveillance camera are being developed. One or more cameras are simultaneously or sequentially operated depending on a surveillance target and a surveillance location to capture an image of the surveillance target and transmit a video signal to a monitor or a storage device.

Meanwhile, the dome-type camera generally has a hemispherical shape, and includes a base on which a bracket for fixing a lens, a camera module, a circuit part, and the like is mounted, a hemispherical cover, and a fixing member for fastening the hemispherical cover to the base.

Therefore, a conventional dome-type surveillance camera includes a bracket mounted on a base, a lens fixed to the bracket, and a hemispherical cover through which a subject within a surveillance area is visually recognized, and has a problem in that the hemispherical cover has to be separated for adjustment in order to change the surveillance area during initial installation or during use.

As a related art relevant to the above camera, Korean Utility Model Registration No. 20-0467572 (Jun. 14, 2013) discloses a "Dome-type Surveillance Camera Device".

As shown in FIG. 1, the related art discloses a dome-type surveillance camera device in which a camera module 3 having a lens 31 is provided, a bracket for fixing the camera module is installed on a base 1, and a blade part 52 of a hemispherical cover 5 having a window part 51 is coupled to the base 1 by a fixing member 2, the dome-type surveillance camera device including: a sealing small protrusion 22 formed in a seating groove 21 that is formed on an inner side of the fixing member 2 on which the blade part 52 of the hemispherical cover 5 is placed; a plurality of support rods 24 protruding from a horizontal surface 23 located at an upper end of the seating groove 21 of the fixing member 2; a sealing ring 6 having a sectional shape of a "⊂" shape, and fitted while surrounding the blade part 52 of the hemispherical cover 5 to achieve sealing; a ring member 7 formed by bending an upper plate 71 formed in a circumferential surface thereof with a groove 711 into which the support rods 24 are inserted and a lower plate 72 making contact with an upper portion of the blade part 52 of the hemispherical cover 5 to have a sectional shape of a "⌐" shape; fixing bolts 8 fastened to female screws 211 formed on upper portions of the support rods 24, respectively, to prevent the ring member 7 from being separated; and a plurality of pressing portions 11 protruding from an inside of the base 1 to compress the blade part 52 of the hemispherical cover 5 and the sealing ring 6 when the fixing member 2 is coupled to the base 1.

However, according to the related art, in order to adjust a perspective angle of the camera module, the hemispherical cover 5 has to be adjusted after releasing a plurality of fastened screws to separate the hemispherical cover 5 from the base 1, so that in a place where a plurality of dome-type surveillance cameras are installed, a time required to readjust the dome-type surveillance camera after the installation may be increased.

In addition, according to the related art, since a transparent window part is installed on the hemispherical cover 5 in an arc shape, external light is diffusely reflected in the window part, so that quality of an image captured by the camera module may be degraded.

DETAILED DESCRIPTION OF THE INVENTION

Technical Problem

To solve the problems of the related art as described above, an object of the present invention is to provide a triaxial dome-type surveillance camera in which a camera module is tilted or rotated about a triaxial rotary body after releasing an external cover that is detachably coupled so that a perspective angle may be easily adjusted, and a diffused reflection preventing device is provided on an upper cap to which the camera module is coupled so as to block diffusely reflected light that is incident through the upper cap so that quality of a captured image may be improved.

Technical Solution

To achieve the objects described above, according to the present invention, there is provided a triaxial dome-type surveillance camera, which is a dome-type surveillance camera having a hemispherical cap attached to a wall surface or a ceiling to surround an outside of a camera module mounted therein, the triaxial dome-type surveillance camera including: an upper cap having a hemispherical shape, and formed at an upper center thereof with a window hole to allow the camera module to capture an image; a lower cap having a hemispherical shape, coupled to a lower portion of the upper cap to form a spherical shape, and having an axial center coupling part extending downward from a lower center of the lower cap; a base attached to the wall surface or the ceiling, and provided on a top surface thereof with an axial latching part including a plurality of axial latching ends having an inverted-L shape and arranged in a circular shape, and a wire extension hole formed through an inner central portion of the axial latching part; a triaxial rotary body including a cap seating part surrounding an outer periphery of the lower cap when the cap seating part is coupled to the axial center coupling part, and including a rotation support part extending from a lower portion of the cap seating part and having a base recess end extending in an axial center direction from a lower end of the rotation support part so as to be coupled to the axial latching end; and an external cover surrounding outsides of the lower cap and the triaxial rotary body, and coupled to an upper portion of the base, wherein the axial center coupling part includes an axial center extension end formed at a center thereof with a through-hole, and an axial center fixing end extending outward from a lower end of the axial center extension end, and the cap seating part is formed at a center thereof with an axial center tilting groove having an arc shape and extending in front and rear directions to make close contact with outer peripheries of both sides of the axial center extension end and to allow the axial center fixing end to be latched thereto when the axial center tilting groove is coupled to the axial center coupling part.

The triaxial rotary body may have one side coupled through a hinge and an opposite side fastened through a screw to facilitate coupling and release of the axial center coupling part.

The upper cap may include a module seating end to which the camera module is coupled, and the window hole may be provided with a diffused reflection preventing device surrounding a side portion of the camera module and having a top and a bottom that are opened so that light is incident on a top surface of the camera module.

The external cover may be provided at a lower inner periphery thereof with a detachable coupling part having a plurality of coupling protrusions protruding inward so as to be coupled to the base, the base may be provided at a top front end thereof with a cover coupling part extending upward so as to be coupled to the detachable coupling part, and the cover coupling part may be provided at an outer periphery thereof with a coupling groove recessed inward to allow the coupling protrusion to be inserted into the coupling groove.

The base may be provided at a bottom front end thereof with a base support end extending downward so as to be supported against the wall surface or the ceiling, and the base support end may be provided at one side end thereof with a wire extension groove recessed upward to allow a wire to extend to an outside.

The lower cap may be provided at an upper front end thereof with an upper cap recess groove recessed downward to allow the upper cap to be guided when the upper cap recess groove is coupled to the upper cap, the upper cap may be provided at a lower front end thereof with a lower cap coupling protrusion extending downward so as to be inserted into the upper cap recess groove, the lower cap may be provided at a lower outer periphery thereof with a plurality of lower coupling holes so as to be screw-coupled to the upper cap, and the upper cap may be provided therein with a cap coupling part having an upper coupling hole to communicate with the lower coupling hole.

Advantageous Effects

The triaxial dome-type surveillance camera according to the present invention has the following effects.

First, since the base recess end is provided on the triaxial rotary body so as to be coupled to the axial latching part of the base, the camera module mounted in the upper cap rotates integrally with the triaxial rotary body with respect to the wall surface or the ceiling, so that a capturing angle can be easily adjusted.

Second, when the axial center coupling part of the lower cap and the axial center tilting groove of the triaxial rotary body are coupled to each other, the axial center tilting groove rotates about the hinge to adjust a width, so that the lower cap can be easily fixed, tilted, and rotated.

Third, the detachable coupling part is provided at the lower inner periphery of the external cover so as to be detachably coupled to the cover coupling part extending upward from the top front end of the base, so that the capturing angle of the camera module can be adjusted without any particular tool.

Fourth, since the diffused reflection preventing device coupled to the window hole to allow the light to be supplied to an upper portion of the camera module that is coupled to the upper cap is provided, the light is prevented from being diffusely reflected at the upper cap and incident on the camera module, so that the quality of the captured image can be improved.

BEST MODE

Hereinafter, one embodiment of the present invention will be described in detail with reference to the accompanying drawings.

Figure 1:
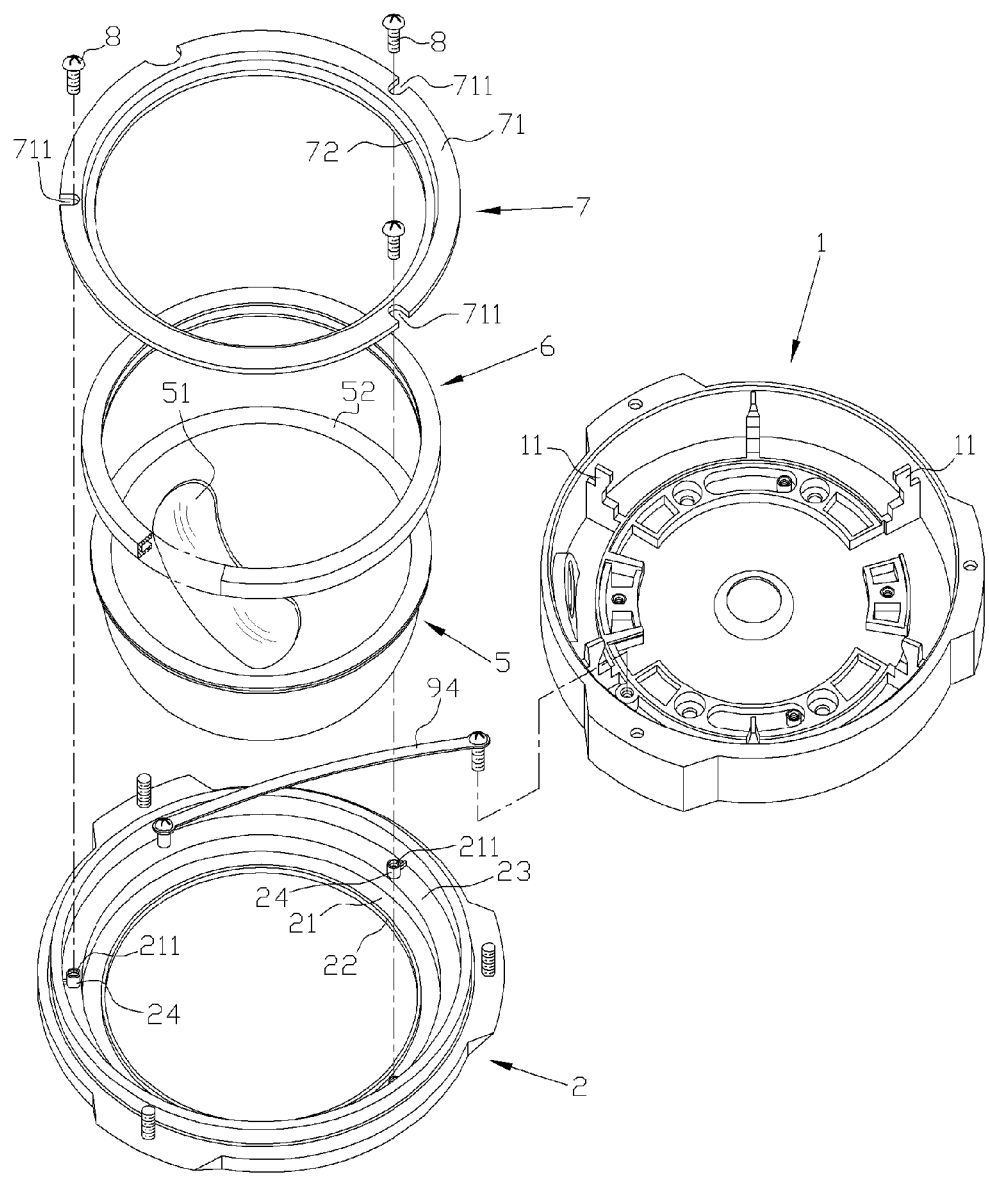
FIG. 1 is a view for describing a dome-type surveillance camera device according to the related art.
Figure 2:
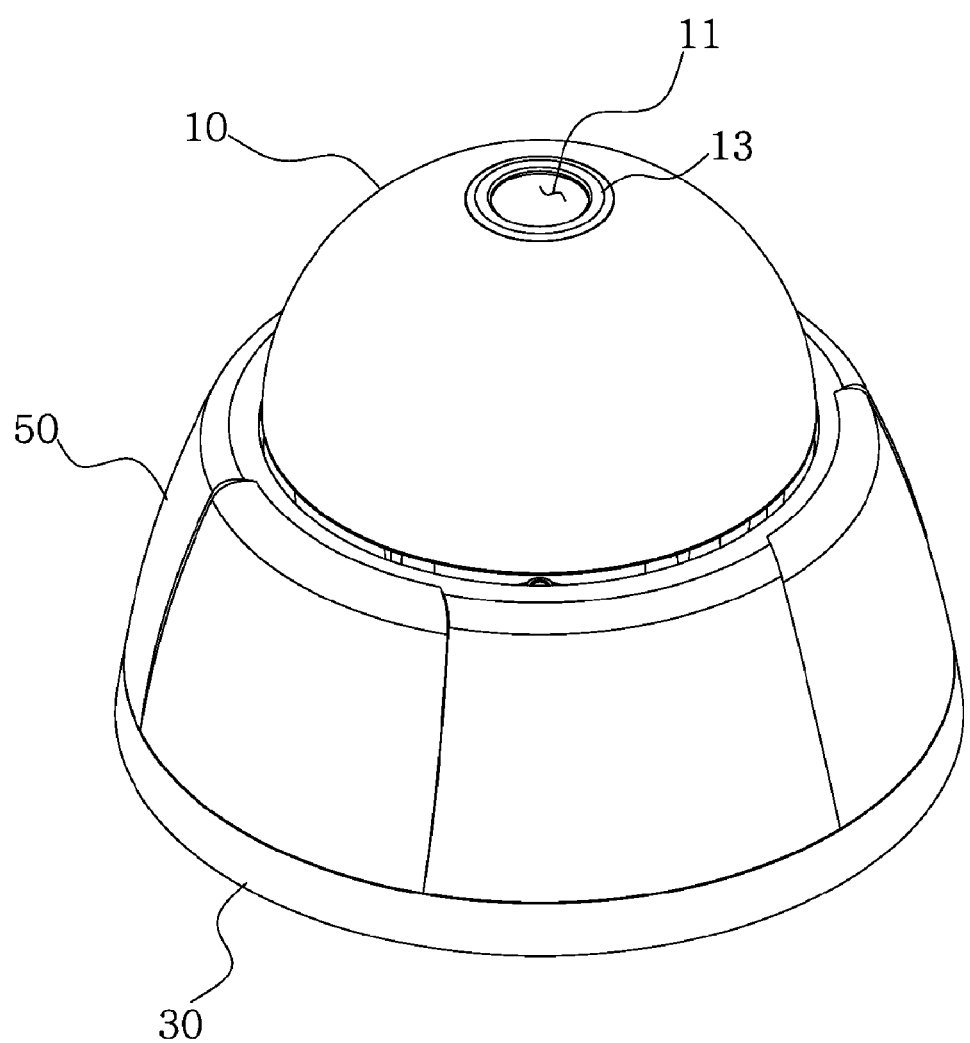
FIG. 2 is a perspective view showing a triaxial dome-type surveillance camera according to the present invention.
Figure 3:
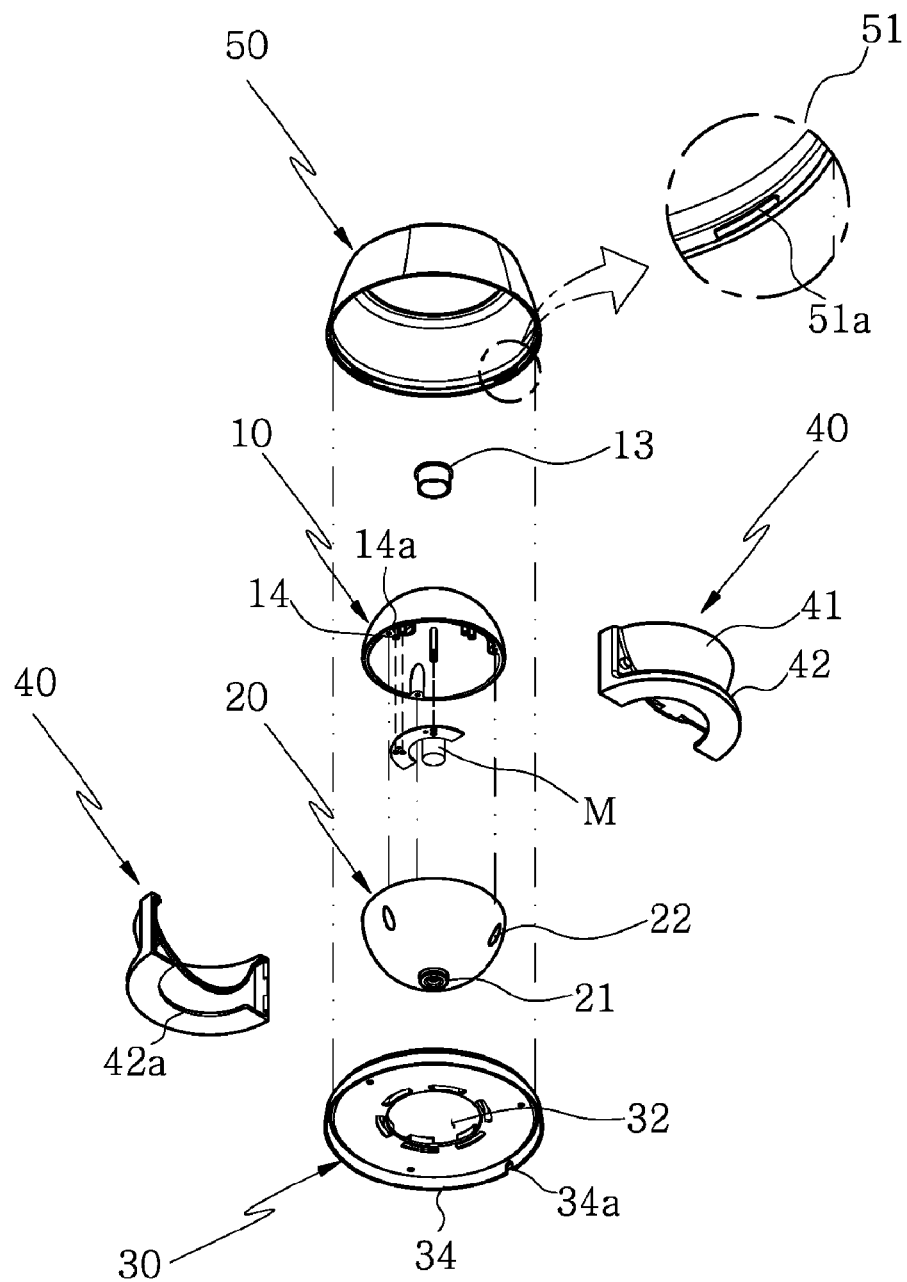
FIG. 3 is an exploded perspective view showing the triaxial dome-type surveillance camera according to the present invention.
Figure 4:
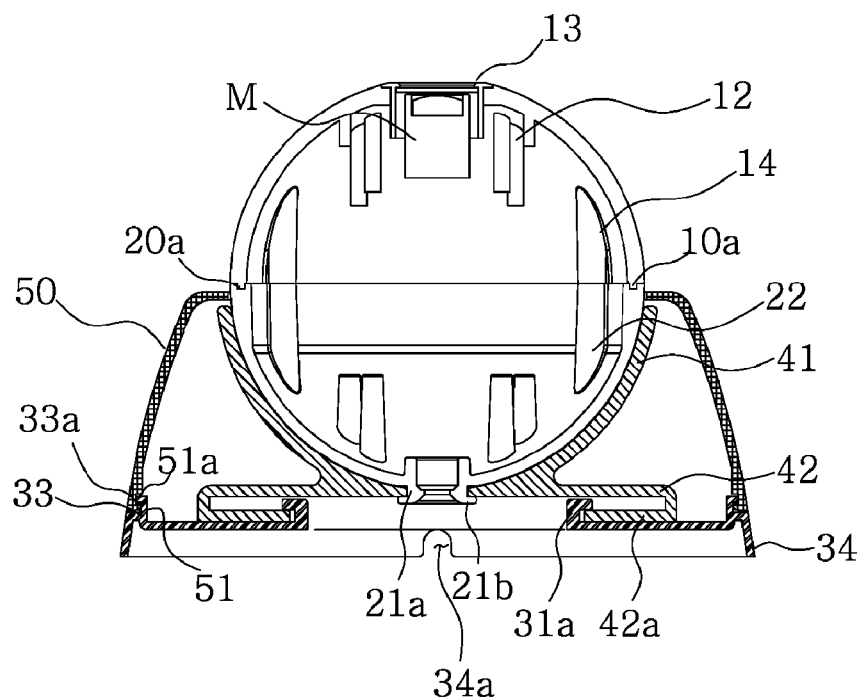
FIG. 4 is a sectional view showing the surveillance camera according to the present invention.
Figure 4:
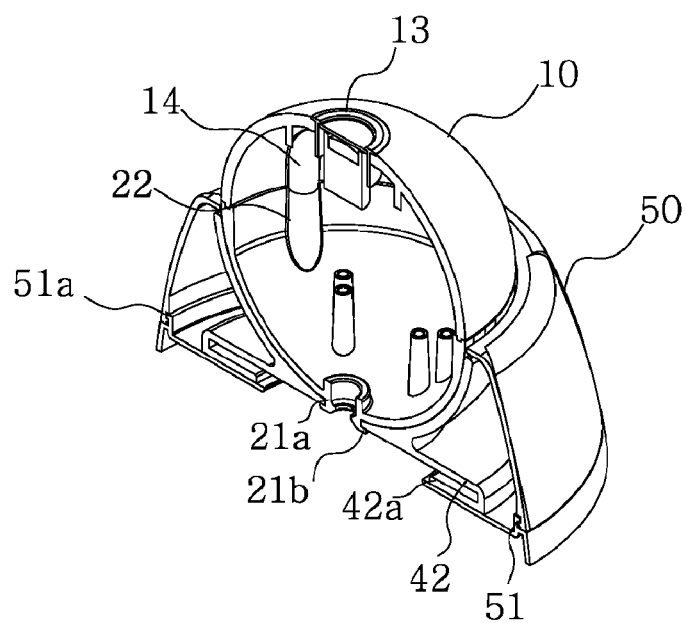
Figure 5:
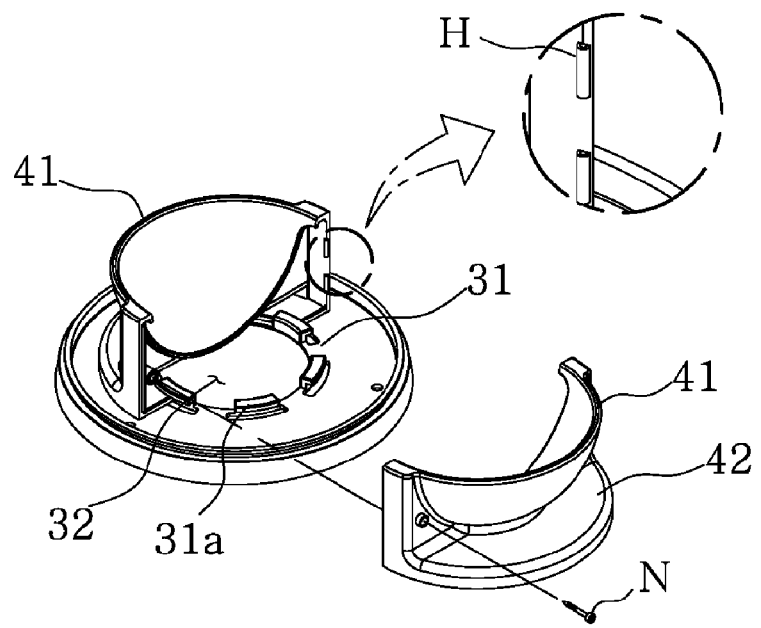
FIG. 5 is a view for describing an operation of a triaxial rotary body according to the present invention.
Figure 5:
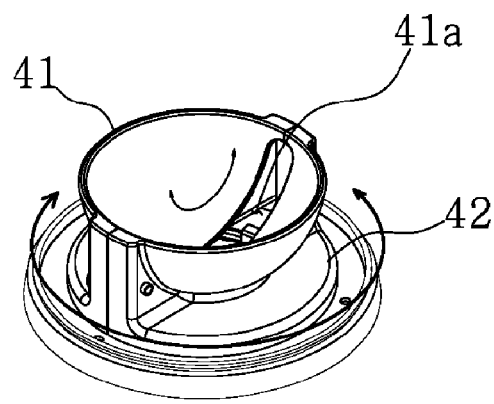

According to the present invention, as shown in FIGS. 2 to 5, a triaxial dome-type surveillance camera, which is a dome-type surveillance camera having a hemispherical cap attached to a wall surface or a ceiling to surround an outside of a camera module M mounted therein, includes: an upper cap 10 having a hemispherical shape, and formed at an upper center thereof with a window hole 11 to allow the camera module M to capture an image; a lower cap 20 having a hemispherical shape, coupled to a lower portion of the upper cap 10 to form a spherical shape, and having an axial center coupling part 21 extending downward from a lower center of the lower cap 20; a base 30 attached to the wall surface or the ceiling, and provided on a top surface thereof with an axial latching part 31 including a plurality of axial latching ends 31a having an inverted-L shape and arranged in a circular shape, and a wire extension hole 32 formed through an inner central portion of the axial latching part 31; a triaxial rotary body 40 including a cap seating part 41 surrounding an outer periphery of the lower cap 20 when the cap seating part 41 is coupled to the axial center coupling part 21, and including a rotation support part 42 extending from a lower portion of the cap seating part 41 and having a base recess end 42a extending in an axial center direction from a lower end of the rotation support part 42 so as to be coupled to the axial latching end 31a; and an external cover 50 surrounding outsides of the lower cap 20 and the triaxial rotary body 40, and coupled to an upper portion of the base 30.

In this case, the axial center coupling part 21 may include an axial center extension end 21a formed at a center thereof with a through-hole, and an axial center fixing end 21b extending outward from a lower end of the axial center extension end 21a, and the cap seating part 41 may be formed at a center thereof with an axial center tilting groove 41a having an arc shape and extending in front and rear directions to make close contact with outer peripheries of both sides of the axial center extension end 21a and to allow the axial center fixing end 21b to be latched thereto when the axial center tilting groove 41a is coupled to the axial center coupling part 21.

Therefore, when the lower cap 20 is seated on the cap seating part 41, the axial center coupling part 21 may be coupled to the axial center tilting groove 41a, so that the lower cap 20 may be tilted about the axial center tilting groove 41a, and may rotate about the axial center coupling part 21.

Meanwhile, the triaxial rotary body 40 may have one side coupled through a hinge H and an opposite side fastened through a screw N to facilitate coupling and release of the axial center coupling part 21. In other words, the triaxial rotary body 40 may be bisected based on the axial center tilting groove 41a, and may rotate about the hinge H.

In addition, the upper cap 10 may include a module seating end 12 to which the camera module M is coupled, and the window hole 11 may be provided with a diffused reflection preventing device 13 surrounding a side portion of the camera module M and having a top and a bottom that are opened so that light is incident on a top surface of the camera module M. The diffused reflection preventing device 13 may prevent external light from being incident on the side portion of the camera module M, so that quality of a captured image of the camera module M may be improved.

Further, the external cover 50 may be provided at a lower inner periphery thereof with a detachable coupling part 51 having a plurality of coupling protrusions 51a protruding inward so as to be coupled to the base 30, the base 30 may be provided at a top front end thereof with a cover coupling part 33 extending upward so as to be coupled to the detachable coupling part 51, and the cover coupling part 33 may be provided at an outer periphery thereof with a coupling groove 33a recessed inward to allow the coupling protrusion 51a to be inserted into the coupling groove 33a.

Since the external cover 50 is detachably coupled to and separated from the base 30, rotation adjustment of the lower cap 20 and the triaxial rotary body 40 that are disposed inside the external cover 50 may be facilitated.

Meanwhile, the base 30 may be provided at a bottom front end thereof with a base support end 34 extending downward so as to be supported against the wall surface or the ceiling, and the base support end 34 may be provided at one side end thereof with a wire extension groove 34a recessed upward to allow a wire to extend to an outside, so that a wire may be stably extended while the base 30 makes close contact with the wall surface or the ceiling.

In addition, the lower cap 20 may be provided at an upper front end thereof with an upper cap recess groove 20a recessed downward to allow the upper cap 10 to be guided when the upper cap recess groove 20a is coupled to the upper cap 10, and the upper cap 10 may be provided at a lower front end thereof with a lower cap coupling protrusion 10a extending downward so as to be inserted into the upper cap recess groove 20a, so that the lower cap 20 and the upper cap 10 may be easily coupled to each other.

Further, the lower cap 20 may be provided at a lower outer periphery thereof with a plurality of lower coupling holes 22 so as to be screw-coupled to the upper cap 10, and the upper cap 10 may be provided therein with a cap coupling part 14 having an upper coupling hole 14a to communicate with the lower coupling hole 22, so that the upper cap 10 and the lower cap 20 are integrally coupled to each other so as to be tilted and rotated about the axial coupling part 21.

An operation of the triaxial dome-type surveillance camera according to the present invention, which has the above-described configuration, will be described as follows.

As shown in FIGS. 2 to 5, in the triaxial dome-type surveillance camera according to the present invention, the triaxial rotary body 40 may be coupled to the upper portion of the base 30, and the lower outer periphery of the lower cap 20 coupled to the upper cap 10 may be seated on an inner periphery of the triaxial rotary body 40. In addition, the external cover 50 may be coupled to the base 30 to surround the outsides of the triaxial rotary body 40 and the lower cap 20.

In this case, the base recess end 42a of the triaxial rotary body 40 may be rotatably coupled to the axial latching part 31 provided on the top surface of the base 30 and including a plurality of axial latching ends 31a having an inverted-L shape and arranged in a circular shape. In other words, the camera module M mounted in the upper cap 10 may monoaxially rotate with the base recess end 42a and the axial latching end 31a serving as an axial center according to the rotation of the triaxial rotary body 40.

In addition, the axial center coupling part 21 of the lower cap 20 may be inserted into the axial center tilting groove 41a having an arc shape and formed in the cap seating part 41 of the triaxial rotary body 40, so that biaxial and triaxial rotations may be performed. In other words, in the axial center tilting groove 41a, the lower cap 20 may be biaxially tilted based on a center of the cap seating part 41 at a point where the lower cap 20 is tilted while moving to front and rear surfaces, and may be triaxially rotated about an axial center of the axial center coupling part 21 so that acapturing angle may be adjusted.

In this case, the triaxial rotary body 40 may have one side coupled through the hinge H and an opposite side fastened through the screw N so that a width of a center in which the axial center tilting groove 41a is formed may be adjusted. In other words, the screw N may be released to enlarge the width of the axial center tilting groove 41a so that a tilting angle and a rotation angle of the axial center coupling part 21 may be adjusted, and the screw N may be fastened to allow an end of the axial center tilting groove 41a to make close contact with an outer periphery of the axial center coupling part 21 so that the lower cap 20 may be fixed.

Through such adjustment, a perspective angle of the camera module M may be easily adjusted by fastening and releasing one screw N.

Meanwhile, since the window hole 11 of the upper cap 10 may be provided with the diffused reflection preventing device 13 surrounding the side portion of the camera module M and having the top and the bottom that are opened, diffusely reflected light that is incident from a side portion of the window hole 11 may be blocked, so that the quality of the captured image may be improved. A transparent lens (not shown) for blocking external dust and moisture may be provided at an upper front end of the diffused reflection preventing device 13.

In addition, the detachable coupling part 51 coupled to the cover coupling part 33 provided at the top front end of the base 30 may be provided at an inner periphery of the external cover 50, so that the capturing angle of the camera module M may be adjusted by releasing the coupling of the cover coupling part 33 and the detachable coupling part 51 with a simple tool such as a screwdriver.

Further, referring to the lower cap 20 and the upper cap 10, the lower coupling hole 22 of the lower cap 20 and the upper coupling hole 14a of the upper cap 10 are screw-fastened to each other while the lower cap coupling protrusion 10a of the upper cap 10 is seated in the upper cap recess groove 20a, so that the upper cap 10 and the lower cap 20 may be easily fastened to each other.

Meanwhile, the wire extending from the camera module M may extend to the outside through the axial center coupling part 21 of the lower cap 20 and the wire extension hole 32 and the wire extension groove 34a of the base 30, so that the base 30 may be firmly fixed in close contact with the wall surface or the ceiling.

The present invention is not limited to a specific exemplary embodiment described above, various modifications can be implemented by a person having ordinary skill in the art to which the present invention pertains without departing from the gist of the present invention as disclosed in the appended claims, and such modifications shall fall within the scope of the disclosed claims.

DESCRIPTION OF REFERENCE NUMERALS

---

10: Upper cap
10a: Lower cap coupling protrusion
11: Window hole
12: Module seating end
13: Diffused reflection preventing device
14: Cap coupling part
14a: Upper coupling hole
20: Lower cap
20a: Upper cap recess groove
21: Axial center coupling part
21a: Axial center extension end
21b: Axial center fixing end
22: Lower coupling hole
30: Base
31: Axial latching part
31a: Axial latching end
32: Wire extension hole
33: Cover coupling part
33a: Coupling groove
34: Base support end
34a: Wire extension groove
40: Triaxial rotary body
41: Cap seating part
41a: Axial center tilting groove
42: Rotation support part
42a: Base recess end
50: External cover
51: Detachable coupling part
51a: Coupling protrusion
H: Hinge
M: Camera module
N: Screw

---

The invention claimed is:

1. A triaxial dome-type surveillance camera, which is a dome-type surveillance camera having a hemispherical cap attached to a wall surface or a ceiling to surround an outside of a camera module (M) mounted therein, the triaxial dome-type surveillance camera comprising:
    an upper cap (10) having a hemispherical shape, and formed at an upper center thereof with a window hole (11) to allow the camera module (M) to capture an image;
    a lower cap (20) having a hemispherical shape, coupled to a lower portion of the upper cap (10) to form a spherical shape, and having an axial center coupling part (21) extending downward from a lower center of the lower cap (20);
    a base (30) attached to the wall surface or the ceiling, and provided on a top surface thereof with an axial latching part (31) including a plurality of axial latching ends (31a) having an inverted-L shape and arranged in a circular shape, and a wire extension hole (32) formed through an inner central portion of the axial latching part (31);
    a triaxial rotary body (40) including a cap seating part (41) surrounding an outer periphery of the lower cap (20) when the cap seating part (41) is coupled to the axial center coupling part (21), and including a rotation support part (42) extending from a lower portion of the cap seating part (41) and having a base recess end (42a) extending in an axial center direction from a lower end of the rotation support part (42) so as to be coupled to the axial latching end (31a); and
    an external cover (50) surrounding outsides of the lower cap (20) and the triaxial rotary body (40), and coupled to an upper portion of the base (30), wherein the axial center coupling part (21) includes an axial center extension end (21a) formed at a center thereof with a through-hole, and an axial center fixing end (21b) extending outward from a lower end of the axial center extension end (21a), and
    the cap seating part(41) is formed at a center thereof with an axial center tilting groove (41a)having an arc shape and extending in front and rear directions to make close contact with outer peripheries of both sides of the axial center extension end (21a)and to allow the axial center fixing end (21b) to be latched thereto when the axial center tilting groove (41a) is coupled to the axial center coupling part (21).

2. The triaxial dome-type surveillance camera of claim 1, wherein the triaxial rotary body (40) has one side coupled through a hinge (H) and an opposite side fastened through a screw (N) to facilitate coupling and release of the axial center coupling part (21).

3. The triaxial dome-type surveillance camera of claim 1, wherein the upper cap (10) includes a module seating end (12) to which the camera module (M) is coupled, and
    the window hole (11) is provided with a diffused reflection preventing device (13) surrounding a side portion of the camera module (M) and having a top and a bottom that are opened so that light is incident on a top surface of the camera module (M).

4. The triaxial dome-type surveillance camera of claim 1, wherein the external cover (50) is provided at a lower inner periphery thereof with a detachable coupling part (51) having a plurality of coupling protrusions (51a) protruding inward so as to be coupled to the base (30),
    the base (30) is provided at a top front end thereof with a cover coupling part (33) extending upward so as to be coupled to the detachable coupling part (51), and
    the cover coupling part (33) is provided at an outer periphery thereof with a coupling groove (33a) recessed inward to allow the coupling protrusion (51a) to be inserted into the coupling groove (33a).

5. The triaxial dome-type surveillance camera of claim 4, wherein the base (30) is provided at a bottom front end thereof with a base support end (34) extending downward so as to be supported against the wall surface or the ceiling, and
    the base support end (34) is provided at one side end thereof with a wire extension groove (34a) recessed upward to allow a wire to extend to an outside.

6. The triaxial dome-type surveillance camera of claim 1, wherein the lower cap (20) is provided at an upper front end thereof with an upper cap recess groove (20a) recessed downward to allow the upper cap (10) to be guided when the upper cap recess groove (20*a*) is coupled to the upper cap (10), the upper cap (10) is provided at a lower front end thereof with a lower cap coupling protrusion (10*a*) extending downward so as to be inserted into the upper cap recess groove (20*a*), the lower cap (20) is provided at a lower outer periphery thereof with a plurality of lower coupling holes (22)so as to be screw-coupled to the upper cap (10), and the upper cap (10) is provided therein with a cap coupling part (14) having an upper coupling hole (14*a*)to communicate with the lower coupling hole (22).

\* \* \* \* \*